United States Patent [19]
Stone

[11] Patent Number: 5,505,386
[45] Date of Patent: Apr. 9, 1996

[54] REPLACEMENT DROP SPRINKLER ASSEMBLY

[76] Inventor: Merle Stone, Rte. 1, Box 20, Lindsay, Nebr. 68644-9513

[21] Appl. No.: 278,229

[22] Filed: Jul. 21, 1994

[51] Int. Cl.⁶ .................................................. A01G 25/09
[52] U.S. Cl. .......................................... 239/728; 239/447
[58] Field of Search ................................ 239/728–731, 239/726, 739, 743, 734, 436, 443, 446, 447

[56] References Cited

U.S. PATENT DOCUMENTS 4,405,085   9/1983   Meyer ..................................... 239/728

FOREIGN PATENT DOCUMENTS

| 862864 | 9/1981 | U.S.S.R. | 239/734 |
| 1017229 | 5/1983 | U.S.S.R. | 239/734 |
| 1113050 | 9/1984 | U.S.S.R. | 239/734 |
| 1417841 | 8/1988 | U.S.S.R. | 239/726 |
| 1419610 | 8/1988 | U.S.S.R. | 239/726 |

Primary Examiner—Karen B. Merritt
Attorney, Agent, or Firm—Law Offices of John A. Beehner

[57] ABSTRACT

A drop sprinkler assembly for connection to an irrigation conduit of a center pivot irrigation system adjacent a tower support of the system includes a fluid conduit having first and second ends, the first end for fluid communication with an irrigation conduit of a center pivot irrigation system. The assembly also includes a valve having an inlet, two outlets and a switching mechanism for controlling fluid flow through the valve, specifically for allowing fluid flow between the inlet and a selected one of the outlets. The second end of the fluid conduit is in fluid communication with the inlet of the valve. Also included are first and second sprinkler conduits each having an upper and a lower end, the upper end of each sprinkler conduit in fluid communication with one of the outlets of the valve. The lower end of the first sprinkler conduit is positioned downwardly and forwardly of the valve and the lower end of the second sprinkler conduit is positioned downwardly and rearwardly of the valve such that fluid exiting the lower end of the first sprinkler conduit is directed forwardly of the sprinkler assembly and fluid exiting the lower end of the second sprinkler conduit is directed rearwardly of the sprinkler assembly.

17 Claims, 6 Drawing Sheets

REPLACEMENT DROP SPRINKLER ASSEMBLY

BACKGROUND OF THE INVENTION

1. Technical Field

This invention relates to a replacement drop sprinkler assembly for connection to an irrigation conduit of a center pivot irrigation system and, more particularly, to a replacement drop sprinkler assembly adapted to be connected to the irrigation conduit of a center pivot irrigation system adjacent a tower support of the system, the assembly including a fluid conduit, a valve having an inlet and two outlets and two sprinkler conduits extending from the valve such that fluid outflow from the sprinkler conduits is directed forward or rearward of the wheels of the center pivot irrigation system.

2. Description of the Prior Art

The advent of irrigation systems has allowed for the use of much land which was previously unusable for the farming of crops. As the demand for produce has increased, use of irrigation systems has likewise increased. Irrigation systems are now used on all types of terrain and in many types of soils.

Center pivot irrigation systems have steadily become the standard apparatus for irrigating crops. This type of irrigation system was originally designed to be used on farmland where the center pivot irrigation system could make a complete circuit of the property. Therefore, early center pivot irrigation systems were designed to travel only in a clockwise or counterclockwise direction, there being no need to provide a reversing mechanism for the irrigation system. More recently however, center pivot irrigation systems have been used in areas which require the system to be able to reverse to avoid obstacles such as wetlands or property boundaries.

Another popular modification to the standard center pivot irrigation system is to replace the standard above-pipeline sprinklers with low pressure revolving or spray nozzles on drops. A drop is a fluid conduit which extends from the main irrigation conduit downwards towards the ground, thus bringing the nozzle closer to the ground to prevent evaporation of the irrigation water before contact with crops is achieved. Adjacent each of the wheeled towers, however, a standard drop will not function correctly, as the tower structure impedes proper distribution of water from the nozzle. Instead, center pivot irrigation systems are commonly fitted what are known as "boom backs", which are fluid conduits which extend downwardly and rearwardly from the main irrigation conduit and end in a sprinkler position behind the rearmost wheel of the irrigation tower. This allows the sprinkler to dispense water without the sprinkler pattern being disrupted by the tower structure. Use of such a "boom back" is therefore acceptable with center pivot irrigation systems traveling only in a single direction.

When a standard boom back is used on a center pivot irrigation system which is capable of reversing direction, however, when the system is reversed, water from the boom back nozzle is distributed directly in front of the leading wheel of the irrigation tower. Because the wheel is effectively tracking through newly formed mud, the resulting wheel rut is substantially deeper than the rut produced by the wheel traveling over dry ground. Therefore, it is highly undesirable for the sprinkler system to dispense water in front of the leading wheel of an irrigation tower. Furthermore, because standard boom backs utilize 360° nozzles, the adjacent tower support wheel is sprayed with some amount of water, which is undesirable. Therefore, there is a need for a directional sprinkler which will prevent water from being deposited on the surface of the tower support wheel.

While various examples from the prior art disclose nozzles which project water rearwards of the irrigation system (see Kinkead, U.S. Pat. No. 3,493,176, Dejoie et al., U.S. Pat. No. 4,363,444, and Paul, U.S. Pat. No. 3,589,604), none of these devices address and solve the problems encountered when a reversible center pivot irrigation system is used.

Therefore, an object of the present invention is to provide an approved replacement drop sprinkler apparatus.

Another object of the present invention is to provide a replacement pump sprinkler assembly which includes a fluid conduit connected to the main irrigation conduit, a two-way valve connected to the opposite end of the fluid conduit, and a pair of irrigation conduits, one extending downwardly and forwardly and the other extending downwardly and rearwardly such that water may be ejected forwardly or rearwardly of the center pivot irrigation system depending on the direction of motion of the system.

Another object of the present invention is to provide a replacement drop sprinkler assembly which may be quickly and easily installed on a variety of types of center pivot irrigation system systems.

Another object of the present invention is to provide a replacement drop sprinkler assembly which will project water forwards or rearwards of the irrigation tower wheels while preventing substantial amounts of water from accumulating on the wheel surfaces.

Another object of the present invention is to provide a replacement drop sprinkler assembly which will assist in the prevention of deep wheel ruts caused by irrigation system wheels tracking through newly formed mud.

Finally, an object of the present invention is to provide a replacement drop sprinkler assembly which is relatively simple to manufacture and is safe in use.

SUMMARY OF THE INVENTION

The present invention provides, in combination, a center pivot irrigation system having a front and a rear and having a main irrigation conduit and at least one irrigation system tower having at least one wheel, and at least one drop sprinkler assembly in fluid connection with the main irrigation conduit. The sprinkler assembly includes a fluid conduit having first and second ends, the first end in fluid communication with the main irrigation conduit. Mounted on the second end of the fluid conduit is a valve which includes an inlet, two outlets and a switching mechanism for controlling fluid flow through the valve, the switching mechanism specifically operative to allow fluid flow between the inlet and a selected one of the outlets. Connected to one of the valve outlets is a first sprinkler conduit, and connected to the other outlet of the valve is a second sprinkler conduit. Each of the first and second sprinkler conduits has upper and lower ends, the upper end of each sprinkler conduit in fluid communication with one of the outlets of the valve.

The drop sprinkler assembly is mounted adjacent the wheeled irrigation system tower on the center pivot irrigation system. The lower end of the first sprinkler conduit is positioned below and forward of the main irrigation conduit such that fluid outflow therefrom is directed forwardly of the wheels of the tower when the center pivot irrigation system is moving in a rearward direction and the lower end of the second sprinkler conduit is positioned below and rearward of the main irrigation conduit such that fluid outflow therefrom is directed rearwardly of the wheels of the tower when the center pivot irrigation system is moving in a forward direction.

The replacement drop sprinkler assembly of the present invention may also be manufactured separately from the center pivot irrigation system and thus may be connected to any existing center pivot irrigation system. Therefore, the benefits of the present invention may be transferred to any center pivot irrigation system which includes the necessary configuration.

The present invention thus provides a substantial improvement over those devices found in the prior art. Whereas, "boom backs" fulfill their purpose on center pivot irrigation systems which travel in a single direction, the present invention may be utilized on reversible center pivot irrigation systems. Furthermore, because the present invention does not dispense water in front of the wheels of the irrigation system, the depth and width of the wheel ruts are significantly reduced. A further advantage of the present invention is that should one of the tires of the center pivot irrigation system go flat, the operator of the system may use a jack to change the flat on dry ground, which means that the jack will not sink into wet ground. The changing of flats is thus greatly facilitated. Finally, because the present invention is simple to manufacture and easy to install, already installed center pivot irrigation systems may be modified to include the present invention, thus eliminating those drawbacks found in the prior art.

DESCRIPTION OF THE PREFERRED EMBODIMENT

The drop sprinkler 10 of the present invention is primarily designed for use with a standard center pivot irrigation system 100. The center pivot irrigation system 100 includes a main irrigation conduit 102, a truss structure 103 supporting the conduit 102 and at least one irrigation system tower 104 on which the main irrigation conduit 102 is mounted. The irrigation system tower 104 includes at least one wheel 106 and a drive mechanism 108, the drive mechanism 108 preferably consisting of a gas or electric motor 110 having a drive shaft 112 extending therefrom, the drive shaft 112 connected to the wheels 106 to provide propulsion therefor. A plurality of standard drop sprinklers 114 depend from the main irrigation conduit 102 at various spots along the conduit 102 for distributing water from the conduit 102. It is preferred that the present invention be used with such a standard center pivot irrigation system 100, although the present invention may be used with modified center pivot irrigation systems or with other types of irrigation systems not including a center pivot.

The drop sprinkler assembly 10 of the present invention is shown in its preferred embodiment in FIGS. 1–7 as including an upper fluid conduit 12 having a first end 14 and a second end 16. It is preferred that the upper fluid conduit 12 be a section of metal or rubber tubing having an inner diameter sufficient to transport substantial quantities of water therethrough. The first end 14 of the upper fluid conduit 12 is mounted in fluid connection to the main irrigation conduit 102 of the center pivot irrigation system 100 adjacent one of the irrigation system towers 104. As shown best in FIGS. 1 and 2, the connection of the first end 14 of the upper fluid conduit 12 to the main irrigation conduit 102 is at the top of the main irrigation conduit 102, thereby allowing more precise control of fluid flow through the upper fluid conduit 12. Therefore, it is preferred that the upper fluid conduit 12 be generally cane-shaped, as shown best in FIG. 2.

Figures 5, 6:
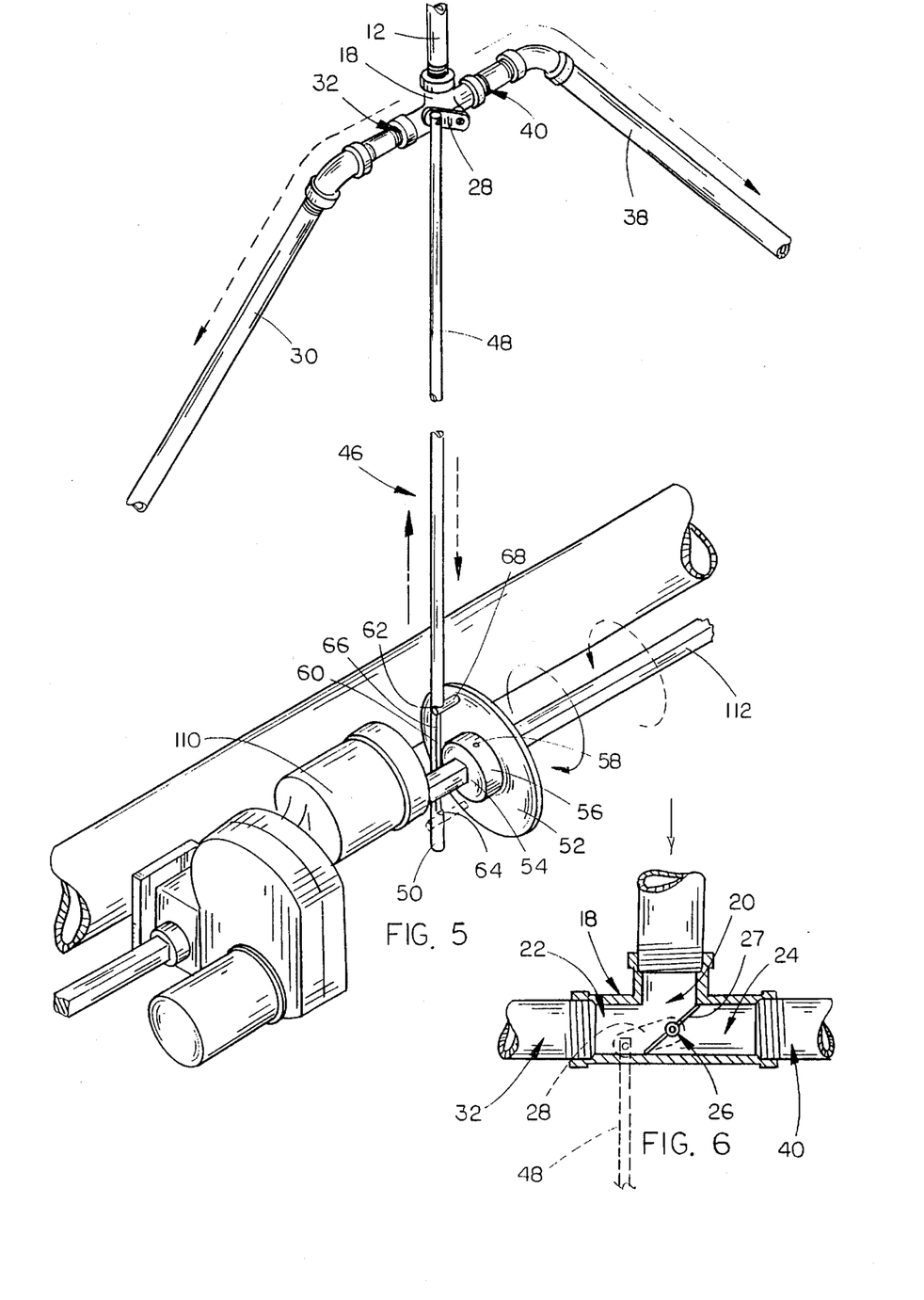
FIG. 5 is a partial detail perspective view of the remote switching assembly of the present invention.
FIG. 6 is a side sectional elevational view of the T-valve of the present invention.
Figure 7:
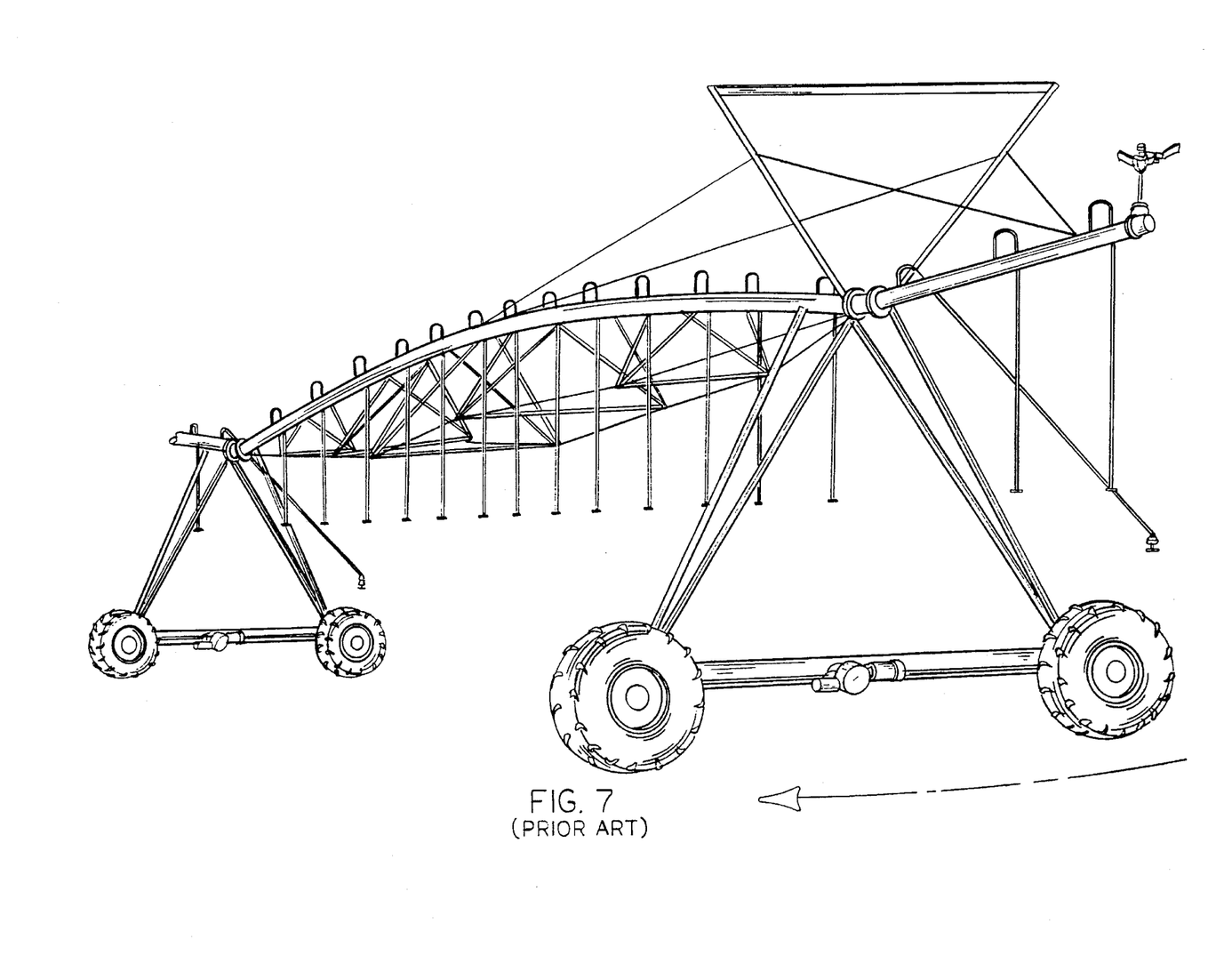
FIG. 7 is a perspective view of a "boom back" found in the prior art.

Mounted on the second end 16 of the upper fluid conduit 12 is a T-valve 18 which includes an inlet 20, a first outlet 22 and a second outlet 24, as best shown in FIG. 6. It is preferred that the T-valve be a standard flow-switchable valve for directing water flow from the inlet 20 to one of the first or second outlets 22 and 24. It is preferred that the body of the T-valve 18 be constructed of a hardened steel to withstand the high water pressure used in the irrigation system. An example of a satisfactory T-valve is known as the WATTS Regulator, manufactured by Watts of North Andover, Mass. Also included in the T-valve is a switching mechanism 26 which includes a gate 27 and a switching lever 28. It is preferred that the gate 27 be similar to a standard butterfly valve which will direct the flow of water through the T-valve 18 from the inlet 20 to either the first outlet 22 or second outlet 24 depending upon the attitude of the gate 27. Such a fluid directing gate is well known in the art of valves. The switching lever 28 extends through the body of the T-valve 18 and is connected to the gate at the pivot axis of the gate. In this manner, the gate may be pivoted to direct water flow to one of the first and second outlets 22 and 24. It is preferred that the switching lever 28 be a metal bar approximately 2–3 inches long, and that the switching mechanism 26 itself be relatively stiff such that a relatively large amount of force is necessary to rotate the switching lever 28.

Extending downwards and forwards from the T-valve 18 and connected to the first outlet 22 is a first sprinkler conduit 30 which is preferably a steel or PVC tube which is threadably connected to the T-valve 18. As shown best in FIGS. 1–3, the first sprinkler conduit 30 extends downwardly and forwardly at an angle of approximately 20°–70° from horizontal, with the upper end of the first sprinkler conduit 30 connected to the first outlet 22 of the T-valve 18. The length of the first sprinkler conduit 30 may vary depending upon the angle of the conduit 30 and the overall size of the irrigation system tower 104. However, it is important that the first sprinkler conduit 30 extend forwardly sufficiently to prevent water flowing therefrom from contacting the forwardmost wheel 106 of the irrigation system tower 104. Therefore, in the preferred embodiment, the lower end 34 of the first sprinkler conduit 30 extends forwardly of the frontmost wheel 106 on the irrigation system tower 104. Although the lower end 34 of the first sprinkler conduit 30 may merely end as a cut-off section of pipe, thus discharging water directly from the conduit 30, it is preferred that a sprinkler 36 be mounted at the lower end 34 of the first sprinkler conduit 30 to regulate and disperse the water flow therefrom. Of course, a variety of sprinkler types may be utilized in connection with the present invention. Crops standing just to the side of the wheel track may therefore receive proper irrigation.

The drop sprinkler assembly 10 further includes a second sprinkler conduit 38 which extends downwardly and rearwardly from the second outlet 24 of the T-valve 18. In all respects, it is preferred that the second sprinkler conduit 38 include the features of the first sprinkler conduit 30, including the upper and lower ends 40 and 42 and sprinkler 44 attached to the lower end 42. The only difference between the second sprinkler conduit 38 and the first sprinkler conduit 30 is that the second sprinkler conduit 38 extends downwards and rearward of the T-valve 18 such that water flowing from the second sprinkler conduit 38 is directed rearwardly of the rearmost wheel 106 on the irrigation system tower 104.

Figure 2:
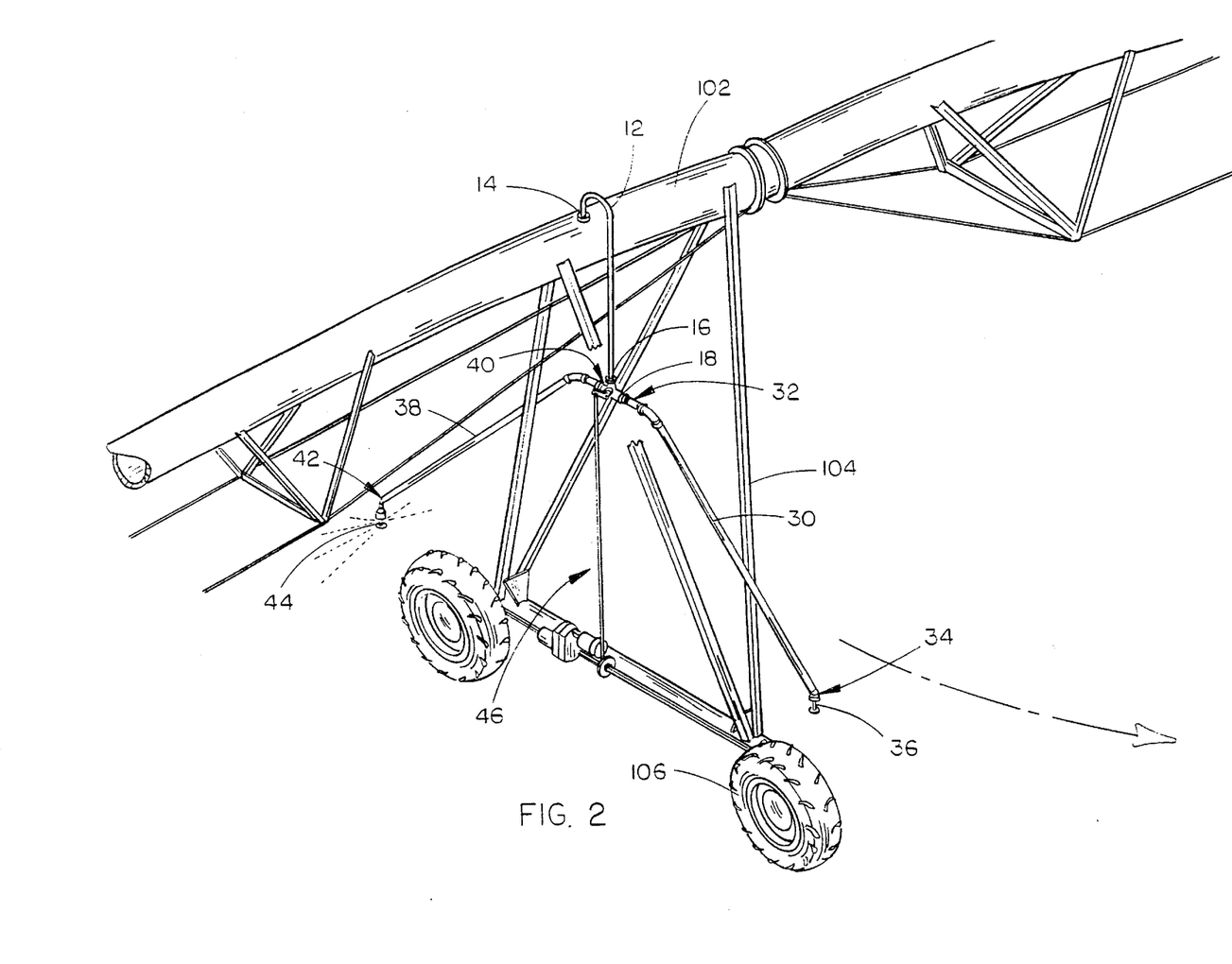
FIG. 2 is a partial detailed perspective view of the sprinkler assembly.

The inclusion of the first and second sprinkler conduits 30 and 38 allows the drop sprinkler assembly 10 of the present invention to direct water flow either forwards or rearward of the irrigation system tower 104, depending upon the direction of motion of the irrigation system tower 104. For example, as shown in FIG. 2, with the center pivot irrigation system 100 moving forwardly (i.e. in a counterclockwise direction), irrigation flow is directed through the second sprinkler conduit 38, and thus water is sprayed to the rear of the irrigation system. Conversely, if the direction of the center pivot irrigation system 100 was reversed, water would be directed through the first sprinkler conduit 30.

It is also preferred that the two drop sprinklers on each side of the replacement drop sprinkler each include modified sprinkler heads which direct water in 180° arcs, instead of allowing full 360° dispersion of water. In this manner, the only irrigation water contacting the wheel track is that dispensed by the first and/or second fluid conduits 30 and 38 of the present invention. The ground directly in front of the foremost wheel thus remains dry during operation of the center pivot irrigation system.

Figure 1:
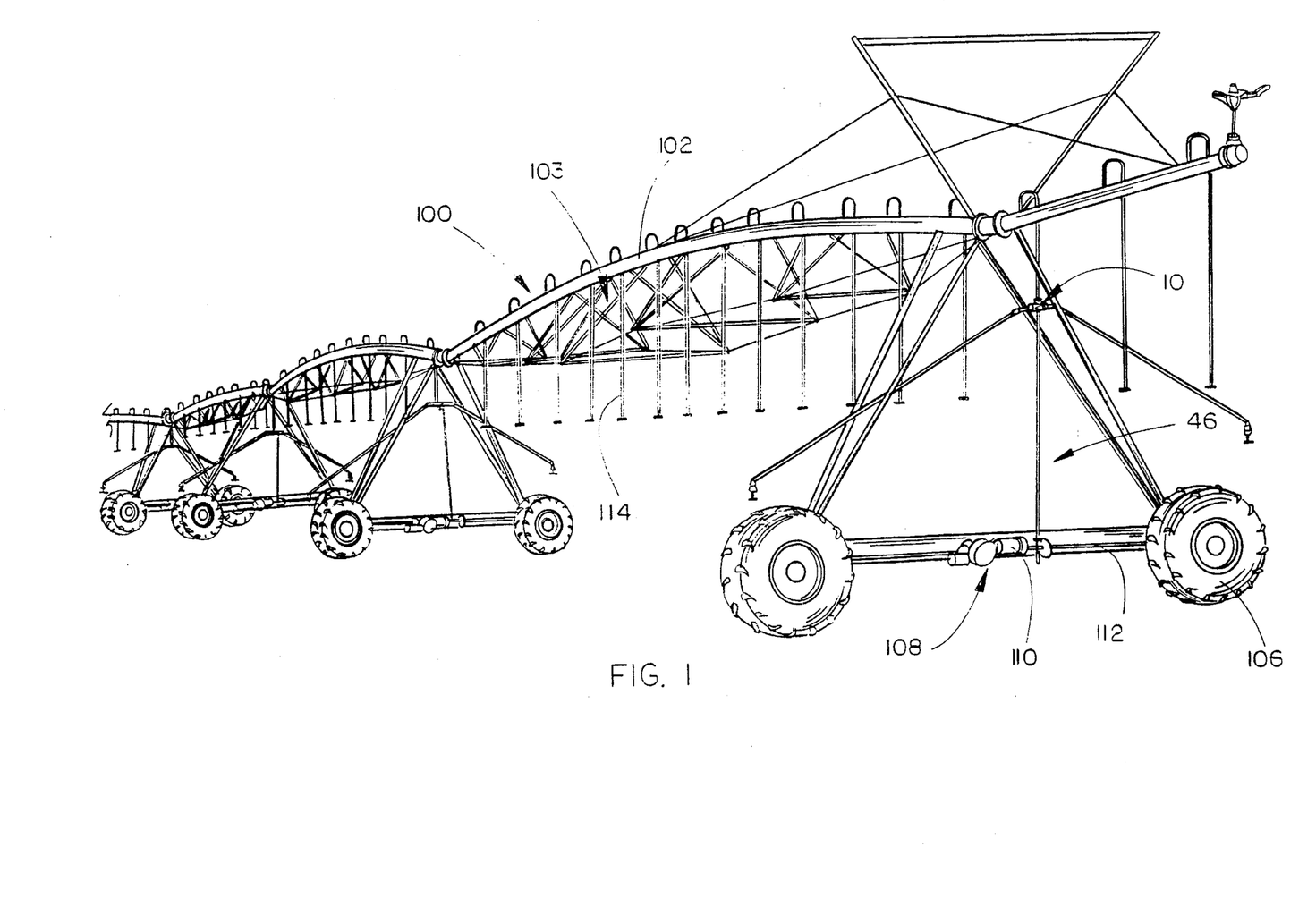
FIG. 1 is a perspective view of the replacement drop sprinkler assembly of the present invention in place on a center pivot irrigation system.
Figure 3:
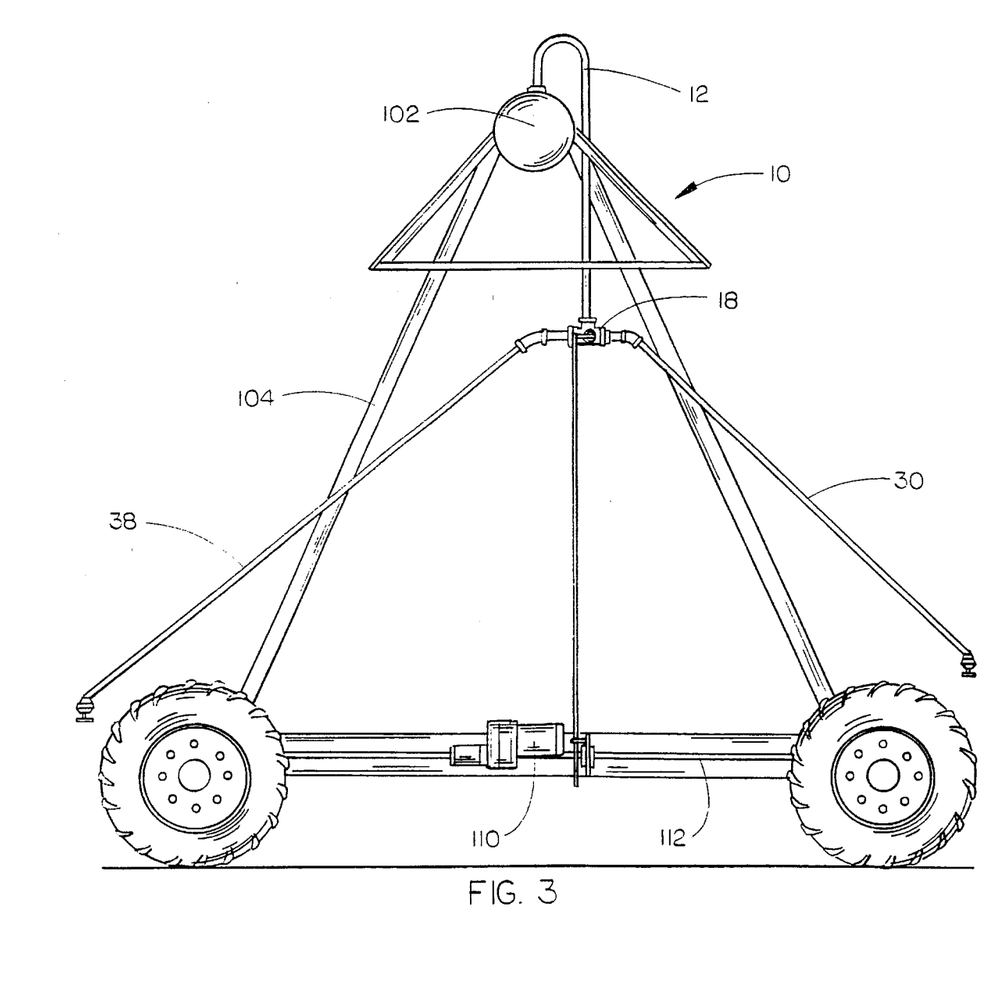
FIG. 3 is an end elevational view of the replacement drop sprinkler assembly in place on a center pivot irrigation system.
Figure 4:
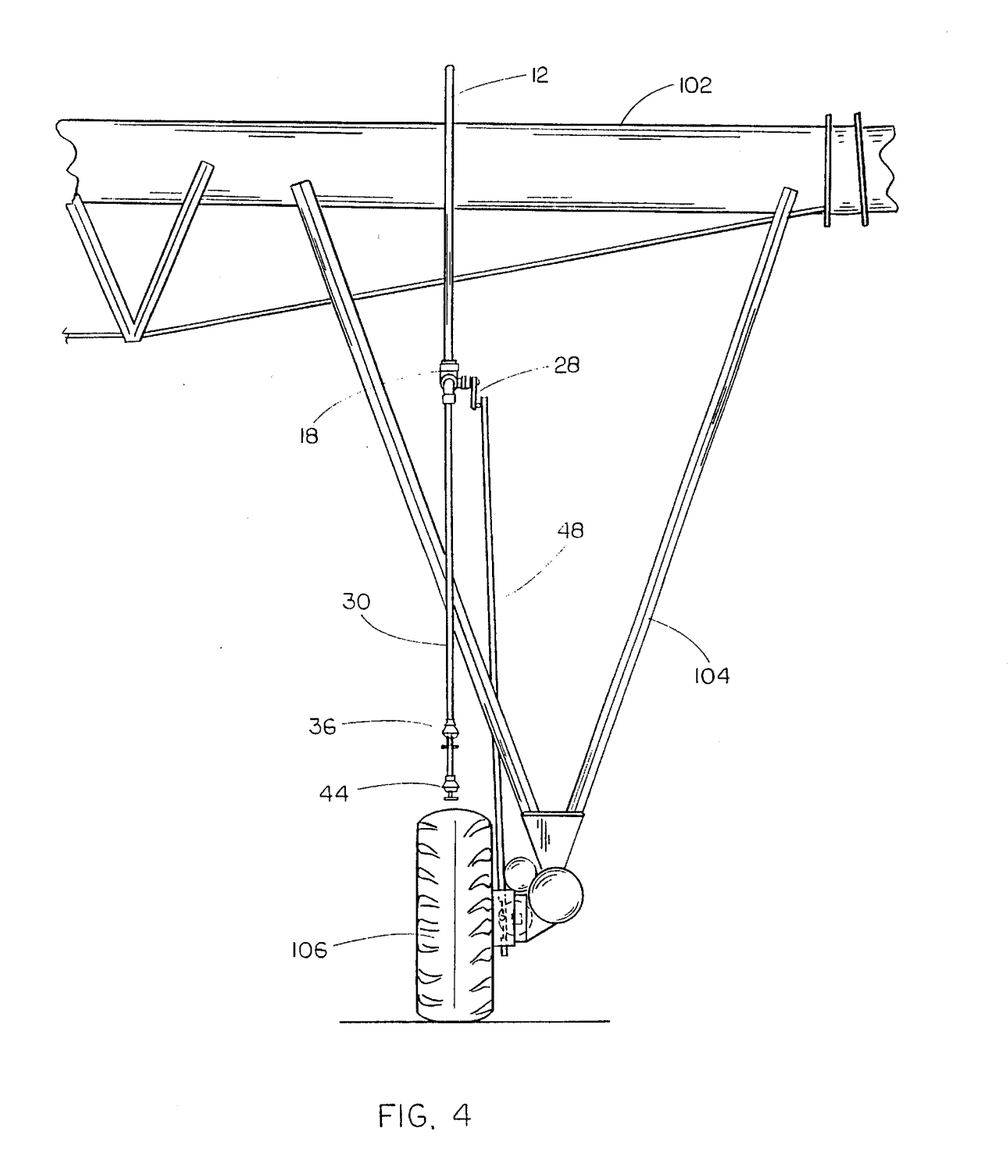
FIG. 4 is a side elevational view of the present invention.

While the switching lever 28 may be manually rotated to switch the outflow of water between the first and second outlets 22 and 24, it is preferred that the drop sprinkler assembly 10 further include a remote switching assembly 46 which is connected to the switching mechanism 26 and is operative to switch the flow of water between the first and second outlets 22 and 24 of the T-valve 18 in response to changing of the direction of movement of the center pivot irrigation system 100. As best seen in FIGS. 1–3, the remote switching assembly 46 includes a longitudinally extended rod 48 which is connected to the free end of the switching lever 28 and depends downwardly therefrom. It is preferred that the rod 48 be constructed of a very light metal, such as aluminum, in order to prevent accidental rotation of the switching lever 28 in response to the weight of the rod 48. Rod 48 may be length-adjustable to fit most, if not all, center pivot irrigation systems presently in use. The adjustment mechanism on the rod 48 may be selected from such devices as telescopic rods, matching holes and pins, slots, or other such devices. It is preferred that the lower end 50 of the rod 48 extend to a point below the drive shaft 112, as shown in FIG. 5.

Mounted on the drive shaft 112 is a circular plate 52 having a center hole 54 formed in the plate 52. Mounted on the circular plate 52 concentric with the hole 54 is a set ring 56 which includes a set screw 58 extending transversely through the set ring 56. It is preferred that the circular plate 52 and set ring 56 be formed of hardened tempered steel to increase the usable life span of the circular plate 52 and set ring 56. The set ring 56 and circular plate 52 are fit onto the drive shaft 112 by sliding the drive shaft 112 through the hole 54 and moving the circular plate 52 to the desired location on the drive shaft 112. When the circular plate 52 is positioned correctly, the set screw 58 is extended into the set ring 56, thus securing the set ring 56 and circular plate 52 against the drive shaft 112. In this manner, rotation of the drive shaft 112 results in rotation of the set ring 56 and circular plate 52 at the same revelational speed.

Formed in the longitudinally extended rod 48 is a notch 60, shown best in FIG. 5. The notch 60 preferably includes generally horizontal notch ends 62 and 64 and a notch base 66, the depth of the notch 60 preferably being approximately one-half the diameter of the longitudinally extended rod 48. It is preferred that the notch 60 face either toward the end of the center pivot irrigation system 100 or towards the center pivot of the center pivot irrigation system 100.

Mounted on the circular plate 52 adjacent the outer edge of the circular plate 52 and generally aligned with the center rotational axis of the circular plate 52 is a pin 68, best shown in FIG. 5. It is this pin 68 which acts to operate the switching mechanism 26 of the T-valve 18 as the pin 68 rotates with the circular plate 52. When the drive shaft 112 is rotating in a clockwise direction, pin 68 orbits the drive shaft 112 in a clockwise manner. During this orbit, the pin 68 contacts the longitudinally extended rod 48, as shown in FIG. 5. The pin 68 moves the longitudinally extended rod 48 outwards away from the drive shaft as rotation of the circular plate 52 continues. However, when the pin 68 comes into contact with the lower notch end 64 of the notch 60, the pin 68 is momentarily retained within the lower notch end 64, thus translating the orbital motion of the pin 68 into a downwards force acting on the longitudinally extended rod 48. The downward force on the rod in turn acts to rotate the switching lever 28 to which the rod 48 is attached. This causes gate 27 to rotate, thus switching the outflow of water from one of the first and second outlets 22 and 24 to the other of the first and second outlets 22 and 24 of the T-valve 18. Conversely, when the drive shaft 112 is rotating in a counterclockwise direction, the opposite reaction occurs, with pin 68 contacting the upper notch end 62 and being momentarily held therein. Thus the orbital motion of the pin 68 is translated into an upwards force on rod 48, thus rotating the switching lever 28 and thereby rotating gate Water flow is again switched from one of the first and second 27. outlets 22 and 24 to the other of the first and second outlets 22 and 24.

Of course numerous other switching methods and mechanisms can be used with the drop sprinkler assembly 10 of the present invention. For example, an electrical switching mechanism may be attached to the switching lever 28 such that when the drive shaft 112 is reversed, the switching lever 28 is rotated to move the gate 27. It is to be understood that although the remote switching assembly 46 of the present invention has been described with some degree of particularity, the present invention is not limited to the switching assembly described herein.

It is further to be understood that the above description is not intended in any way to limit the scope of the present invention, and that the scope of the invention shall follow in the claims set forth below.

There has thus been shown and described a drop sprinkler assembly which accomplishes at least all of the stated objectives.

I claim:

1. In combination:

a center pivot irrigation system having a front and a rear and having a main irrigation conduit and at least one irrigation system tower having at least one wheel; and at least one drop sprinkler assembly in fluid connection with said main irrigation conduit, said sprinkler assembly comprising;

a fluid conduit having first and second ends, said first end in fluid communication with said main irrigation conduit;

a valve having an inlet, two outlets and a switching mechanism for controlling fluid flow through said valve, for allowing fluid flow between said inlet and a selected one of said outlets;

said second end of said fluid conduit in fluid communication with said inlet of said valve;

first and second sprinkler conduits each having upper and lower ends, said upper end of each sprinkler conduit in fluid communication with one of said outlets of said valve;

said drop sprinkler assembly mounted adjacent said wheeled irrigation system tower on said center pivot irrigation system;

said lower end of said first sprinkler conduit positioned below and forward of said main irrigation conduit such that fluid outflow therefrom is directed forwardly of said at least one wheel of said tower when said center pivot irrigation system is moving in a rearward direction; and said lower end of said second sprinkler conduit positioned below and rearward of said main irrigation conduit such that fluid outflow therefrom is directed rearwardly of said at least one wheel of said tower when said center pivot irrigation system is moving in a forward direction.

2. The combination of claim 1 wherein said fluid conduit comprises a section of generally rigid tubing having an inner diameter sufficient to transport quantities of water therethrough.

3. The combination of claim 1 wherein said valve comprises a T-valve in which said outlets are aligned at generally right angles with said inlet thereby forming a generally T-shape.

4. The combination of claim 3 wherein said switching mechanism of said T-valve comprises a generally flat pivoting plate mounted within said T-valve between said inlet and said two outlets, said plate pivoting to direct water from said inlet to one of said outlets.

5. The combination of claim 4 wherein said valve further comprises a switching lever pivotally mounted on the outer surface of said T-valve, said switching lever operatively connected to said generally flat plate such that rotation of said switching lever causes rotation of said plate thereby switching flow of fluid from said inlet to one or the other of said outlets.

6. The combination of claim 5 wherein said center pivot irrigation system further comprises a motor and drive shaft, said drive shaft operatively connected to at least one of said at least one wheel for rotating said wheel in response to engagement of said motor, said drive shaft rotatably mounted on said irrigation system tower such that said drive shaft rotates about its center longitudinal axis.

7. The combination of claim 6 further comprising a remote switching assembly including a longitudinally extended rod depending from and connected to said switching lever and a generally circular plate having a center longitudinal axis, said circular plate mounted on said drive shaft adjacent said longitudinally extended rod, said longitudinally extended rod further including a notch formed adjacent said circular plate, said circular plate further including a pin protruding transversely from said circular plate generally aligned with said center longitudinal axis of said plate, said pin and said notch cooperating such that rotation of said circular plate results in said pin engaging said notch thereby forcing said rod upwards and downwards depending upon the direction of rotation of said circular plate.

8. The combination of claim 1 wherein said first and second sprinkler conduits each further comprise generally rigid tubing having an inner diameter sufficient to transport quantities with water therethrough.

9. The combination of claim 1 further comprising a pair of sprinkler heads, mounted on each of said lower ends of said first and second sprinkler conduits such that fluid flowing through said first and second sprinkler conduits may be more evenly distributed.

10. A drop sprinkler assembly for connection to an irrigation conduit of a center pivot irrigation system adjacent a tower support of the system, said drop sprinkler assembly comprising;

a fluid conduit having first and second ends, said first end for fluid communication with an irrigation conduit of a center pivot irrigation system;

a valve having an inlet, two outlets and a switching mechanism for controlling fluid flow through said valve, for allowing fluid flow between said inlet and a selected one of said outlets;

said second end of said fluid conduit in fluid communication with said inlet of said valve;

first and second sprinkler conduits each having upper and lower ends, said upper end of each sprinkler conduit in fluid communication with one of said outlets of said valve; and said lower end of said first sprinkler conduit positioned downwardly and forwardly of said valve and said lower end of said second sprinkler positioned downwardly and rearwardly of said valve such that fluid exiting said lower end of said first sprinkler conduit is directed forwardly of said sprinkler assembly and fluid exiting said lower end of said second sprinkler conduit is directed rearwardly of said sprinkler assembly.

11. The drop sprinkler assembly of claim 10 wherein said fluid conduit comprises a section of generally rigid tubing having an inner diameter sufficient to transport quantities of water therethrough.

12. The drop sprinkle assembly of claim 11 wherein said valve comprises a T-valve in which said outlets are aligned at generally right angles with said inlet thereby forming a generally T-shape.

13. The drop sprinkle assembly of claim 12 wherein said switching mechanism of said T-valve comprises a generally flat pivoting plate mounted within said T-valve between said inlet and said two outlets, said plate pivoting to direct water from said inlet to one of said outlets.

14. The drop sprinkle assembly of claim 13 wherein said valve further comprises a switching lever pivotally mounted on the outer surface of said T-valve, said switching lever operatively connected to said generally flat plate such that rotation of said switching lever causes rotation of said plate thereby switching flow of fluid from said inlet to one or the other of said outlets.

15. The drop sprinkler head of claim 14 further comprising a remote switching means operatively connected to said switching lever on said valve, said remote switching means operative to rotate said lever in response to change in the direction of movement of the irrigation system tower.

16. The drop sprinkler head of claim 10 wherein said first and second sprinkler conduits each further comprise generally rigid tubing having an inner diameter sufficient to transport quantities of water therethrough.

17. The drop sprinkle assembly of claim 10 further comprising a pair of sprinkler heads, mounted on each of said lower ends of said first and second sprinkler conduits such that fluid flowing through said first and second sprinkler conduits may be more evenly distributed.

* * * * *